Oct. 25, 1955 H. B. DANNEIL 2,721,596
COMBINATION PURSE AND SHOPPING BAG
Filed Jan. 17, 1955

INVENTOR.
HERTA B. DANNEIL
BY
Eugene C. Knoblock
ATTORNEY

United States Patent Office 2,721,596
Patented Oct. 25, 1955

2,721,596

COMBINATION PURSE AND SHOPPING BAG

Herta B. Danneil, Mishawaka, Ind.

Application January 17, 1955, Serial No. 482,098

10 Claims. (Cl. 150—1.7)

This invention relates to improvements in combination purse and shopping bag.

The primary object of this invention is to provide a purse which is so constructed as to house a shopping bag in collapsed position so as to be convenient for use and so as to accommodate extension thereof for use at will.

A further object is to provide a device of this character in which a shopping bag is so connected to and assembled with a purse as to accommodate collapse thereof within the outline of the purse or extension thereof to a position in which the purse can be carried and handled readily, with full access to both the purse and shopping bag made possible at all times.

A further object is to provide a device of this character in which a purse has a compartment between its outer sheath and its liner outlined in part by a section of the outer sheath adapted to be released for access to the compartment and adapted, when released, either to overlie the mouth of the shopping bag or to extend into the shopping bag, and also having an aperture therein through which a handle of the shopping bag may project.

Other objects will be apparent from the following specification.

Figure 1:
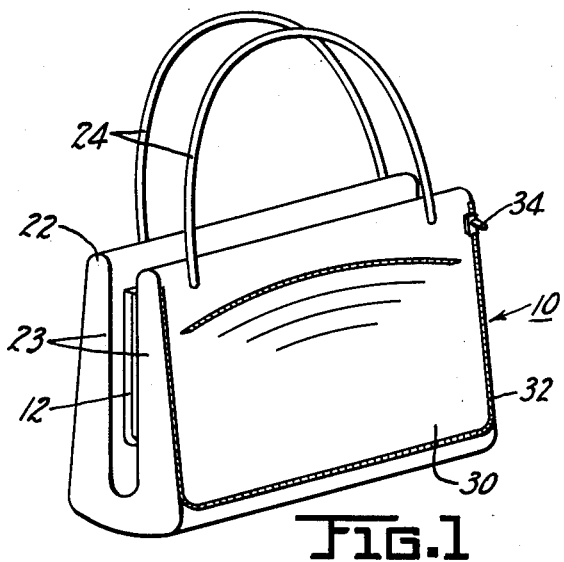
Fig. 1 is a perspective view of my new combination purse and shopping bag.

Referring to the drawing which illustrates the preferred embodiment of the invention, the numeral 10 designates a purse or handbag which may be of any conventional construction and which includes frame members 12 of substantially U-shape pivotally connected at 14 at their free ends. The frame members 12 may be of any shape and style desired and, while two such frame members are shown, it will be understood that more than two frame members may be employed in cases where it is desired to provide the purse with multiple compartments. The frame members 12 are preferably of configured cross-sectional shape serving to secure together the margins of various portions of the purse, such as inner linings 16 thereof and outer sheath portions 18. The inner sheath 16 may be formed of cloth, leather or plastic sheet material and includes side and end portions 17 and a bottom 19. The outer sheath 18 likewise includes side and end portions 20 and a bottom 21. In the preferred form, the outer sheath will preferably project above the frame at 22 and laterally outwardly of the frame at 23, although this is not required. The outer sheath will preferably be formed of leather, artificial leather, fabric or plastic sheet material, or any other material employed in the art for the purpose of making ladies' purses or handbags. One or more handle straps or loops 24 may be provided upon the purse, anchored in any suitable manner thereto as well understood in the art. In the form illustrated I prefer to employ straps or loops 24 which pass through apertures in the outer sheath 18 at the upper portions 22 thereof and which mount retainers 26 at their ends bearing against the inner surface of the outer sheath or against the liner carried by the outer sheath around the aperture.

Figure 2:
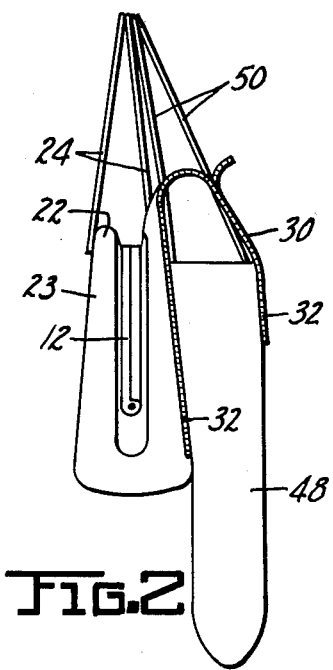
Fig. 2 is an end view illustrating the extended position of the shopping bag and the open position of the panel for confining the shopping bag.

In my preferred construction one side panel 30 of the outer sheath is cut away from the remainder of the outer sheath along a substantially U-shaped line of separation, as best seen in Fig. 1, extending from the opposite ends of one of the upwardly projecting portions 22 downwardly along the outer or laterally projecting portions 23 substantially to the bottom 21 and thence across the junction between the side panel of the purse and the bottom thereof. The adjacent portions of the outer sheath of the purse along the aforesaid cut line separating the panel 30 from the remainder of the outer sheath of the purse, are provided with slide fastener members 32 adapted to be traversed by the usual slider 34 to selectively lock and release the panel 30 relative to the remainder of the outer sheath. When in open position, the panel 30 may swing outwardly as illustrated in Fig. 2. If desired, the panel 30 may have a reinforcing panel 36 secured to its inner face and preferably anchored marginally thereof and at the adjacent frame member.

The panel 30 has a transverse elongated slit 38 extending substantially full width thereof. Adjacent the upper end thereof slide fastener members 40 and slider 42 cooperating therewith serve as means to selectively hold open or closed the slit 38. Where the panel 30 is provided with the liner 36 it will be understood that an opening will be formed in the reinforcing panel 36 in register with the opening 38.

Figure 4:
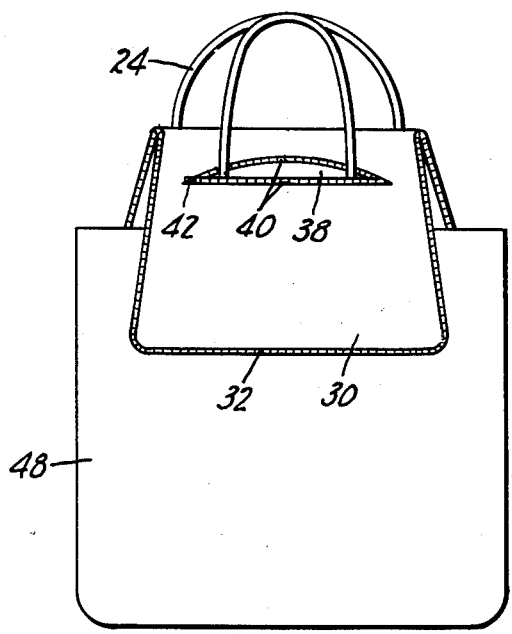
Fig. 4 is a side view of the combination purse and shopping bag in open position.
Figure 3:
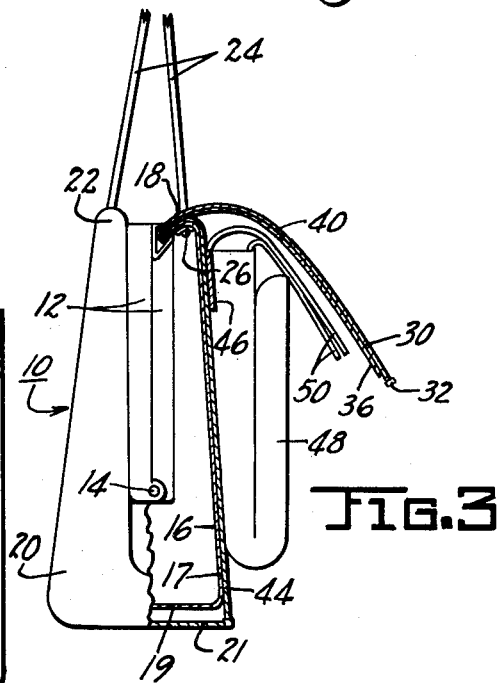
Fig. 3 is an end view of the combination purse and shopping bag in closed position with parts shown in section.

A reinforcing panel 44, which, like the panel 36, may be formed of fabric, leather, synthetic resin sheet material, cardboard, or like material, is secured to and cooperates with the portion of the inner liner 17 adjacent to and overlapped by panel 30 of the outer sheath. The reinforcing panel 44 will preferably be secured marginally to the adjacent liner 17 and preferably will be anchored at the frame 12 to at least the upper run thereof. The upper portion of one side wall 46 of a flexible shopping bag 48 is fixedly secured to the panel 44 and the inner liner 17 associated therewith at the upper portion thereof but spaced below the uppermost ends of the U-shaped slit or opening which defines the outer panel 30. The shopping bag 48 is preferably formed of flexible material, such as fabric, synthetic resin sheeting, leather or artificial leather, and may be of any suitable construction open at its upper end and closed at its bottom. As best illustrated in Figs. 3 and 4, the shopping bag will preferably be of a height and width greater than the height and width of the purse 10 when extended. The bag will preferably have straps 50 anchored at the upper margins of both its inner and outer wall portions, although only one thereof is required, as at the outer wall. The shopping bag 48 is preferably formed of material sufficiently thin and flexible to accommodate compact folding thereof to fit within the outline of the purse and to be confined in the chamber or compartment between the panel 30 and the inner liner panel 17 juxtaposed thereto and carrying the reinforcing panel 44. For this purpose the shopping bag will be provided with a plurality of vertical or upright folds to reduce the width of the bag to a dimension less than the length of the purse and with one or more horizontal transverse folds to reduce the overall height of the bag to a dimension less than the height of the purse. The straps 50 will likewise be flexible so that they may be folded to lie within the outline of the purse to be confined between the inner and outer sheath portions thereof when the unit is collapsed. The relation of the top edge of the shopping bag 48 to the transverse opening 38 in the panel 30 will preferably be such that the opening extends alongside the upper edge or slightly above the upper edge of the shopping bag when in closed position.

In the use of the device it will normally be carried as a purse and, when so carried, will be in compact or collapsed position as shown in Fig. 1, with the panel 30 being fixedly anchored to the remainder of the outer sheath of the purse, as illustrated in Fig. 1, and with the separable fasteners 40, 42 closing the opening 38 in the panel 30. In this condition the shopping bag 48 will be completely concealed and will be compactly folded to flat form positioned completely within the confines of the outer sheath of the purse and housed within the compartment separating the outer sheath and the inner liner of the purse. The purse may be opened and closed at will for access to its contents. It will be understood that the outer sheath of the purse will preferably be so shaped as to be substantially symmetrical when the shopping container 48 is housed therein. Consequently, only the slide fasteners 32 and 40 are visible in the Fig. 1 position of the parts, and as to these parts lips or like marginal portions may overhang or overlap the fasteners in the manner well understood in the art to either completely conceal the fasteners or to render them less conspicuous.

Whenever it is desired to use the shopping bag, the fasteners 32 and 40 may be manipulated to open the same, thus giving access to the folded or collapsed shopping bag 48 normally confined within the outline of the purse. After the panel 30 has been opened, the shopping bag may be extended both vertically and laterally to the positions shown in Figs. 3 and 4, lying alongside and projecting below the purse. The panel 30 may either be positioned as illustrated in Fig. 4 overlying a portion of the mouth of the shopping bag and having both of the straps 50 of the shopping bag extended through the opening 38 thereof, or may extend into the shopping bag. In the latter instance only the inner strap 50 of the shopping bag may extend through the slit 38 in the panel 30. It will be understood that in the event that only one strap 50, anchored at the outer wall of the shopping bag 48, is provided, it will be possible to eliminate completely the opening 38 in the panel 30 and to position the same within the shopping container when open. However, I prefer to employ two straps 50 in order to render the construction sturdy so that the shopping bag may accommodate heavy articles. It will also be understood that the reinforcing panels herein described at 36 and 44 may be omitted if desired, but I prefer to use such panels in each instance to strengthen and rigidify the construction. The straps 50 of the shopping bag will preferably be of such length as to extend alongside the straps 24 of the purse, as illustrated in Fig. 2, when the unit is extended so as to accommodate grasping of both purse straps and the shopping bag straps while the device is being carried.

It will be observed that the shopping bag and the purse are both accessible independently of each other when the device is in extended position. Thus it is not necessary for the user to manipulate any portion of the device except the fastener for the frame 12 of the purse in order to reach the contents of the purse. Likewise, the contents of the purse are not dislodged or displaced nor need they be manipulated at any time in order to convert the device from its fully closed or its fully open position. When use of the device is completed and the shopping bag has been emptied, it can readily be folded to the flat compact form shown in Fig. 3 and positioned within the overall outline of the outer sheath of the purse to facilitate and accommodate closing of the slide fasteners 32 outlining the panel 30, so that the overall outline of the purse resumes the Fig. 1 shape and the shopping bag is completely concealed and confined. It will be understood that the handles 50 of the shopping bag will be preferably withdrawn from the slit 38 prior to manipulation of the fasteners 32 but this is not essential and the bag handles 50 may be retracted through the slot 38 after the unit has been collapsed.

While the preferred embodiment of the invention has been illustrated and described herein, it will be understood that changes in the construction may be made within the scope of the appended claims without departing from the spirit of the invention.

I claim:

1. A combination purse and shopping bag comprising a purse having an outer sheath and a liner, both carried by pivotally connected frame members and defining a compartment therebetween, one wall portion of said sheath being separated from the remainder of said sheath at its bottom and two sides, separable fastener means connecting said wall and the remaining sheath portion, and a flexible shopping bag open at its top and having a side wall secured at its upper portion to the liner of said purse spaced below the upper portion of said sheath wall portion, said shopping bag being of a size to project laterally beyond the ends of said purse and to depend below said purse when extended, whereby said sheath wall portion may extend into said shopping bag.

2. A combination purse and shopping bag as defined in claim 1, wherein said purse has handle straps, and at least the outer side wall portion of said shopping bag mounts a handle strap adapted to extend adjacent to said purse straps.

3. A combination purse and shopping bag as defined in claim 1, and a reinforcing panel secured to said liner and anchored to said frame, said shopping bag being secured to said reinforcing panel.

4. A combination purse and shopping bag as defined in claim 1, wherein said sheath wall portion has an opening therein, and a handle strap is carried by said shopping bag and adapted to extend through said last named opening.

5. A combination purse and shopping bag as defined in claim 1, wherein said sheath wall portion has an opening therein adjacent the upper end of said shopping bag, a handle member is carried by the upper end of said bag and adapted to project through said opening, and separable fastener means are provided for closing said opening.

6. A combination purse and shopping bag comprising a pivoted frame, a flexible outer purse sheath carried by said frame and including a side panel portion joined at its upper margin to the upper portion of said sheath, a flexible liner carried by said frame and cooperating with said sheath and panel to define a purse compartment accessible through said frame and a second compartment accessible when said panel is open, releasable means for anchoring the marginal portions of said panel to said sheath, and a flexible shopping bag having a side wall secured to said liner adjacent to said panel, said bag being foldable to compact flat form within said second compartment and being extensible to project alongside and below said purse when the panel is open.

7. In combination a purse and shopping bag comprising a purse having a frame mounting an outer sheath and a liner, said sheath having an opening, a panel anchored at a portion of its margin to said sheath and adapted to span said opening, a releasable fastener for detachably securing the remainder of said panel to said sheath, a flexible shopping bag anchored to said liner adjacent said opening and foldable to compact flat form to be confined by said panel and said sheath, said bag being extensible through said opening to a position alongside and exterior of said purse.

8. A combination purse and shopping bag as defined in claim 7, and a handle strap carried by the upper end of said bag and adapted to extend through said opening.

9. A combination purse and shopping bag as defined in claim 7, wherein said panel has an opening adjacent its upper end, and a handle strap is carried by the upper part of said shopping bag and is adapted to extend through said panel opening.

10. A combination purse and shopping bag as defined in claim 7, wherein said bag is wider and deeper than said purse when open, and said panel is adapted to extend into said bag.

References Cited in the file of this patent

UNITED STATES PATENTS

| | | |
|---|---|---|
| 920,852 | Flanagan | May 4, 1909 |
| 932,721 | Rueter | Aug. 31, 1909 |
| 2,450,040 | Gibson | Sept. 28, 1948 |
| 2,479,824 | Fass | Aug. 23, 1949 |

FOREIGN PATENTS

| | | |
|---|---|---|
| 684,955 | France | July 3, 1930 |
| 708,322 | Great Britain | May 5, 1954 |